United States Patent Office 3,477,857
Patented Nov. 11, 1969

3,477,857
MARGARINE COMPOSITION AND
PREPARATION THEREOF
Jay T. Colburn, Glen Ellyn, Ill., assignor to Armour and
Company, Chicago, Ill., a corporation of Delaware
No Drawing. Filed June 11, 1965, Ser. No. 463,370
Int. Cl. A23d 3/02
U.S. Cl. 99—123                                   8 Claims

ABSTRACT OF THE DISCLOSURE

A margarine product having an intensified butter flavor is blended with normal margarines or shortening materials to yield a product capable of imparting a butter flavor to baked goods.

This invention relates to a margarine composition and the preparation thereof, and more particularly to the preparation of a unique margarine product which is utilized by diluting it with normal margarine or other shortening materials in providing a desirable buttery flavor in cooked or prepared foods. The margarine is particularly useful in the bakery, confectionery, and frozen food fields where the prepared product is given a buttery flavor.

The present method of producing a single strength butter flavor in margarine is by adding diacetyl or starter distillate in the milk phase of the margarine after the milk has been cultured. By "single strength" is meant the same flavor which would be obtained in the product if a good quality of butter were fully utilized. However, when the margarine so prepared is used in a baked or other processed product, it is found that most of the flavor due to the diacetyl or starter distillate is vaporized in the oven or lost during the processing.

Further, in the preparation of cakes and many other baked products, it is desirable to use certain special use shortenings which are most effective in producing desired cake volumes and other characteristics, and such shortenings cannot be fully utilized because the margarine or butter is needed in quantity in order to impart the butter flavor to the baked product.

I have discovered that margarine can be prepared with a buttery or enhanced margarine flavor many times that of the single strength butter flavor, thus permitting dilution with large amounts of the desired shortenings so that improved volume or other characteristics imparted by the shortening can be fully utilized. In my process, flavor-yielding short chain fatty acids, including butyric, caproic, capric and caprylic, are employed. The flavor level is maintained by the high level of such short chain fatty acids in the product and to their low flavor thresholds. By way of example, such flavor thresholds in air may be listed as follows:

| Acid: | G./cc. of air parts per billion |
|---|---|
| Butyric | .001 |
| Caproic | .0003 |

By way of example, I prefer to prepare a margarine having a fourfold strength butter flavor and which may be diluted by shortening the ratio of 1:3. This gives great flexibility in the preparation of cakes, confections, etc., so that without sacrificing butter flavor a large number of other shortenings may be employed with the margarine to give the baked or processed product all of the resultant advantages.

A primary object of the invention, therefore, is to provide a process for the preparation of a margarine which will give a several fold butter flavor over the single strength butter flavor and which permits the dilution thereof with other shortenings. A further object is to provide a produce prepared from said margarine and diluted with shortening having improved qualities not only in butter flavor but also in structure. A still further object is to provide a process in which lipolyzed cream may be substituted for a portion of the milk used in margarine preparation and in which the subsequent blending of the margarine components therewith is effective in producing a product having several fold butter flavor strength over that of a single strength butter flavor. Other specific objects and advantages will appear as the specification proceeds.

In one embodiment of the invention, a margarine emulsion is prepared in the usual manner by blending milk and margarine oils in the presence of emulsifying agents, etc. To the emulsion, or to the milk which is added to the oils in forming the emulsion, there is added a lipolyzed cream having an unusually high content of short chain free fatty acids whereby the butter flavor of the final product is several times greater than single strength butter flavor. The mixture is thoroughly agitated and blended to form a uniform margarine composition. The emulsion which is warm may then be pumped to a votator for chilling and worked to provide the proper plasticity characteristics of margarine.

The finished margarine product which has a butter flavor many times that of a single strength butter flavor is then diluted with a shortening, which may include normal margarine, hydrogenated vegetable shortening, and other shortenings, may then be employed in the preparation of baked goods, confections, etc. For example, the margarine may be used in the preparation of Danish goods, coffee cakes, rolls, butterflake rolls, pound cakes, yellow cakes, butter cookies, pecan crunch, butterscotch candy, butter icings, etc., and the butter flavor in these products has been found good while at the same time the product has advantages flowing from the use of the other shortenings used to dilute the margarine.

In the preparation of the lipolyzed cream, I prefer to employ as an enzyme a lipase preparation made from the gullet tissue of a milk fed animal such as, for example, a calf, and which may be referred to as a pregastric enzyme. Other lipase may be used provided they do not produce off-flavors or are treated to remove off-flavors. Pancreatic lipase gives an objectionable odor and flavor unless the product is treated for removing these in a water phase portion as by centrifugation, etc. The pancreatic lipase has a specificity for the fatty acid moieties attached at the 1 and 3 positions of the glycerol, and since it produces butyric acid in substantial volume, it may be employed if the flavor difficulty can be remedied as by centrifuging off the water phase portion containing the undesirable odor and flavor. I prefer the pregastric lipase, which is known as Italase C, because it has a specificity for the short chain fatty acids and gives a very desirable flavor.

The cream utilized for culturing is pasteurized. It preferably contains from 20 to 50% fat, and best results are obtained when the fat content is 36% or above, a very satisfactory range being 35–40% fat. Salt is preferably added to the cream while cold. The culturing is carried out at about 100–110° F., a gentle agitation being provided by mechanical stirrers to prevent oiling off of the fat.

The enzyme preparation is added to the cream at preferably 2% of the fat weight. The pregastric enzyme is in the form of a dry powder, and water is added to it to form a thick slurry. Salt is also added to assist in retarding micrbiological growth.

Progress of the culturing is followed by titration of the acids with 0.1 N NaOH. Ordinarily, the time required to reach a 1% acidity, calculated as lactic acid, is about 25–30 hours. The acidity may be in the range of 0.70–1.20%, but I prefer to reach an acidity of about 1%. After the desired acidity has been reached, the cream is heat treated to denature the enzyme such as, for example, by heating it to 160–165° F. for 10 minutes and then cooling to 40° F.

The many fold increase of butter flavor strength in the margarine product may be controlled by the acidity of the cultured cream and by the amount of the cream added to the margarine emulsion. For example, 1% acidity cream added at 5.7% of the final product provides 5.7% added acidity as lactic acid and produces a margarine having a fourfold butter flavor. Should the cultured cream have a 1.2% acidity, it would require 4.75% cream to attain the same flavor level.

In the usual practice of the invention, I employ a cultured cream of 1% acidity and add the cream at about 5–10% by weight of the final product. A preferred range of 7–9% gives an excellent several fold increase in the flavor strength, enabling one to dilute the margarine selectively with other shortenings, as described above.

The oils may be any suitable margarine formulations. I prefer to use table margarine formulations so that the product will have about the same melting characteristics of butter, and such oils may be any vegetable shortening oils as, for example, hydrogenated soybean oils.

The emulsifiers may be the usual emulsifiers or combinations thereof, consisting of mono- and diglycerides, and lecithin.

The cultured milk may be prepared by mixing water with non-fat dry milk solids in the usual manner. The cultured cream replaces a portion of the milk and the oil blend. The product may be provided with the usual coloring and vitamins such as Vitamin A, and a small portion of the salt may be added as part of the cultured cream, etc. Diacetyl may be added, and, if desired, the amount may be increased so that when the final product is diluted, the normal amount of diacetyl will be in the product.

The cultured cream is added to the margarine emulsion and the processing proceeds in the usual manner, the margarine emulsion being cooled by a votator and the product being preferably refrigerated.

The margarine product is employed as a butter substitute for flavoring purposes and, by reason of the many fold increase of the flavor level, the margarine is blended with several parts of shortening or margarine. For example, one part of the margarine may be blended with three parts of shortening in the case where the margarine has a fourfold butter flavor strength.

In the preparation of baked products such as pie crust, Danish foods, buttercream icings, cakes, Streusel, pecan crunch candy, butterscotch candy, butter cookies, etc., the product having a fourfold buttery flavor is diluted with three parts of shortening and the foregoing baked products are produced with a good buttery flavor and with other good characteristics due to adding the additional shortening. For example, the cake volume of yellow cake is substantially increased by the use of the additional shortenings which provide such qualities in cakes.

Specific examples illustrative of the process may be set out as follows:

Example I

A fresh cream having 36% fat was treated with pregastric enzyme (Italase C) at a temperature of about 100–110° F., the enzyme being 2% of the cream fat content by weight, and until a final acidity, calculated as lactic acid, was 1.0%, salt being added at 4% of the cream weight. When the acidity of 1% was reached, the cream culture was heated to 160° F. for 10 minutes and then cooled to 40° F.

The margarine oils were formed by blending hydrogenated soybean oils constituting 78.1%, and to those were added .40% of mono- and diglycerides. The salt constituted 3.0%, the cultured milk 12.8%, and the cultured cream 5.7%. To the above may be added 2.6 parts p.p.m. of diacetyl and 15,000 USP units/lb. of Vitamin A.

The quality standards of the final product are set out as follows:

| | |
|---|---|
| Fat | 80.0% min. |
| Salt | 3.0% min. |
| Curd | 1.6±0.1% |
| Vitamin A | 15,000 USP units/lb. |
| Free fatty acid (oleic) | 0.26% min. |

The above product had a pungent odor and an "acid bite." When blended with 3 lbs. of margarine or hydrogenated vegetable shortening, it was found that it approximated the flavor of butter and the butter flavor was found to be present as a single strength butter flavor in the pound cakes in which it was used.

Example II

Pasteurized 36% fat cream was treated with pregastric lipase enzyme (Italase C) to liberate short chain fatty acids. The enzyme was added at 2% of the fat weight as a thick aqueous slurry. Salt was added at 4% of the cream weight. The cream was then heated to 100–110° F. for the duration of the enzyme culturing. The culturing was terminated after 25 hours when the acidity had reached 1% calculated as lactic acid. The culturing was then stopped by heating the cream to 160° F. for 10 minutes. The cream was then cooled to 40° F. until used.

The milk portion for the margarine consisted of nonfat dried milk solids reconstituted to 10% solids with water. The milk was then cultured to a 0.2–0.3 acidity as lactic acid and then pasteurized and cooled. Salt was added to the milk.

The margarine oils were blended hydrogenated soybean oils mixed to provide the proper fat index for a table-type margarine. Emulsifiers, coloring and vitamins were added to the warm oil at about 145° F.

The salted cultured milk was weighed and diacetyl added to the milk. The milk was then pumped into the emulsion tank and vigorously agitated to form the milk in oil emulsion characteristic of margarine. Lipolyzed cream was added to the emulsion and mixed thoroughly. The proportions of the foregoing are set out as follows:

| | |
|---|---|
| Hydrogenated vegetable oils | 156 lbs. |
| Emulsifiers | 1 lb. |
| Artificial coloring | 7.6 grams. |
| Diacetyl solution | 13.36 milliliters. |
| Vitamins A and D | 1.0 gram. |
| Cultured milk | 26 lbs. 13 oz. |
| Cultured (lipolyzed) cream | 11 lbs. 3 oz. |
| Salt | 6 lbs. |

The warm emulsion at a temperature of about 120° F. was pumped to a votator for chilling and working to provide the proper plasticity characteristics for packing. The product was then tempered for 48 hours at 75° F. and refrigerated. Analysis of the product was as follows:

| | Percent |
|---|---|
| Fat | 80.29 |
| Curd | 1.65 |
| Salt | 3.23 |
| Water | 14.83 |
| | 100.00 |

The above product, which had a fourfold strength butter flavor, was then mixed with vegetable hydrogenated shortening in some instances and with bland margarine in other instances and used in bakery products including coffee cakes, rolls, butterflake rolls, pound cakes, yellow cakes, butter cookies, pecan crunch, butterscotch candy, and butter icings. A good butter flavor was found in all of the products and in the cakes particularly increased volume was found as a result of the use of the hydrogenated vegetable shortenings.

In the foregoing process, the lipolyzed cream may be added to the milk or oil or to the emulsion with substantially equal results, and in the appended claims in which the cream is described as added to the margarine emulsion, this will be understood to mean the adding of the cream to the emulsion after being formed or to the ingredients prior to the forming of the emulsion.

In referring to short chain free fatty acids, I intend the short chain fatty acids $C_4$–$C_{10}$ found in the cream and which include as the most important constituent butyric acid together with capric, caprylic, and caproic acids. These short chain free fatty acids are liberated by the enzyme treatment and are effective in giving the product a good butter flavor. As stated, the most important of the four acids mentioned is butyric, which is largest in volume and which is most effective in producing the desired flavor.

I have found that there are seasonal variations in the ability of lipolyzed cream to provide flavor. This is probably due to a change in the diet of the dairy cow. Because of the compositional change of the fatty acids in the milk, it will be understood that some variation in the ranges of acidity and proportions of the lipolyzed cream employed is permitted, but such variations may readily be determined and the principles set out in the foregoing specification may be readily followed by those skilled in the art.

While in the foregoing specification I have set forth a description in considerable detail of steps and ingredients employed in the practice of the invention, it will be understood that such details may be varied widely by those skilled in the art without departing from the spirit of my invention.

I claim:

1. In the preparation of margarine-shortening to give a butter flavor in prepared foods, in which margarine oils are blended with milk in the presence of emulsifying agents to form a margarine emulsion, the steps of incubating cream containing butter fat with a lipase enzyme which produces short chain free fatty acids with a minimum of off-flavor until a titratable acidity of about 0.70–1.20%, calculated as lactic acid, is obtained, heating to inactivate the lipase, mixing the lipolyzed cream with said emulsion in such proportions as to give a butter flavor strength several fold greater than a single strength butter flavor, and blending the margarine with shortening to provide a product having approximately a single strength butter flavor.

2. In the preparation of a margarine-shortening composition to give a single strength butter flavor, in which margarine oils are blended with milk in the presence of emulsifying agents to form a margarine emulsion, the steps of incubating cream containing butter fat with a lipase enzyme which produces short chain free fatty acids with a minimum of off-flavor until a titratable acidity of about 1%, calculated as lactic acid, is obtained, heating the cream to inactivate the lipase, mixing the lipolyzed cream with said emulsion in such proportion as to give the emulsion a fourfold strength butter flavor, and diluting the margarine with shortening to a single strength butter flavor.

3. The process according to claim 1 wherein said lipase enzyme is a pregastric enzyme.

4. The process according to claim 1 wherein said lipase enzyme is a pregastric enzyme obtained from the gullet tissue of a milk fed animal.

5. The process according to claim 1 wherein said lipolyzer cream has a titratable acidity of about 1% calculated as lactic acid.

6. The process according to claim 1 wherein the proportion of said lipolzed cream is about 2–10% based on the weight of the product.

7. The process of claim 1 in which the cream is mixed with the emulsion in the proportion of about 7–9% by weight.

8. A product prepared by the process of claim 1.

References Cited

UNITED STATES PATENTS

| | | | |
|---|---|---|---|
| 2,233,179 | 2/1941 | Otting et al. | 99—123 |
| 2,794,743 | 6/1957 | Farnham | 99—56 |

MAURICE W. GREENSTEIN, Primary Examiner

U.S. Cl. X.R.

99—118, 119, 140